United States Patent [19]

Chiba

[11] Patent Number: 5,867,463
[45] Date of Patent: Feb. 2, 1999

[54] RECORDING AND REPRODUCING APPARATUS INCLUDING READ/WRITE MODE REPRODUCING CONTROL PARAMETER SETTING MEANS

[75] Inventor: Takayoshi Chiba, Tokyo, Japan

[73] Assignee: Sony Corporation, Tokyo, Japan

[21] Appl. No.: 705,882

[22] Filed: Aug. 29, 1996

[30]     Foreign Application Priority Data

Aug. 31, 1995  [JP]  Japan ................................... 7-224082

[51] Int. Cl.⁶ .................................................. G11B 7/00
[52] U.S. Cl. ........................................ 369/54; 369/44.29
[58] Field of Search ........................... 369/44–27, 44.28, 369/44.29, 54, 58, 32, 48

[56]                  References Cited

U.S. PATENT DOCUMENTS 4,937,804  6/1990  Ishihara ..................................... 369/48
5,291,467  3/1994  Ishiwata et al. .......................... 369/32
5,353,175  10/1994  Chiba ....................................... 360/51
5,442,613  8/1995  Horiguchi .................................. 369/54
5,508,985  4/1996  Fairchild et al. ......................... 369/54

*Primary Examiner*—Nabil Hindi
*Attorney, Agent, or Firm*—Limbach & Limbach L.L.P.

[57]                       ABSTRACT

A magneto-optical disc recording and reproducing apparatus has the distinction of ID signal reproducing ability in read (reproducing) mode and in write (recording) mode. The disc recording format is based on sectors each including two identifiers in the address field. The apparatus analyzes a command from the host computer (step ST1). It sets the control parameter of write mode for the write command or the control parameter of read mode for the read command (steps ST4, ST5) so as to impose the distinction on the ID signal reproducing (readout) ability between read mode and write mode. Following the seek operation to the target track, it determines based on the ID signal detection as to whether a correct ID signal has not been retrieved from any of two identifiers in the target address field indicative of the error of ID signal reproduction (step ST7). It proceeds to the information writing or readout operation unless the ID signal reproduction ends in error (step ST8).

12 Claims, 10 Drawing Sheets

FIG. 11

| ID1 | ID2 | READ/WRITE OPERATIONS |
|---|---|---|
| ○ | ○ | DATA WRITING···OK<br>DATA READING···OK |
| ○ | × | DATA WRITING···NG<br>DATA READING···OK |
| × | ○ | DATA WRITING···NG<br>DATA READING···OK |
| × | × | DATA WRITING···NG<br>DATA READING···NG |

FIG. 12

| ID1 | ID2 | READ/WRITE OPERATIONS |
|---|---|---|
| ○ | ○ | DATA WRITING···OK<br>DATA READING···OK |
| ○ | × | DATA WRITING···OK<br>DATA READING···OK |
| × | ○ | DATA WRITING···OK<br>DATA READING···OK |
| × | × | DATA WRITING···NG<br>DATA READING ···CERTIFIED BASED ON ID CONTINUITY |

FIG. 13

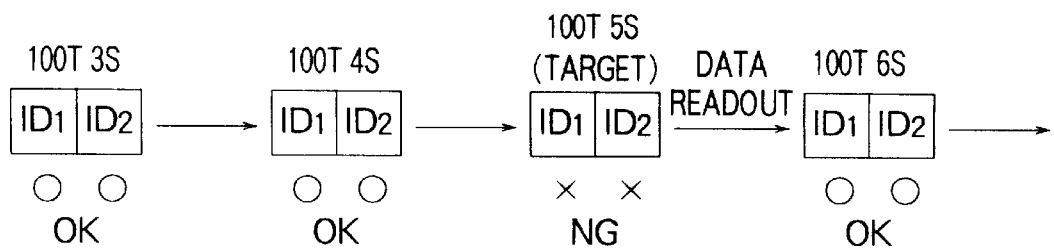

RECORDING AND REPRODUCING APPARATUS INCLUDING READ/WRITE MODE REPRODUCING CONTROL PARAMETER SETTING MEANS

BACKGROUND OF THE INVENTION

The present invention relates to a recording and reproducing apparatus, and particularly to a magneto-optical disc recording and reproducing apparatus.

Various recording formats have been proposed for magneto-optical discs. FIG. 9 shows a sector format of a 5.25-inch magneto-optical disc for recording user data at 512 bytes/sector, and FIG. 10 shows a sector format of a 5.25-inch magneto-optical disc for recording user data at 1024 bytes/sector. These sector formats differ only in the lengths of data field and buffer.

The sector formats shown in FIGS. 9 and 10 include an address field, a flag field, a data field, and a buffer.

The address field is a region having a record of a physical block address that is the physical address of the sector on the disc, and it is preformatted in the form of pits on the disc substrate. The flag field is a region in which flags indicative of the state of data in the sector are recorded. The data field is a region in which user data is recorded. The buffer is a marginal region provided so that the data field and the address field of the neighboring sector do not overlap in the event of a fluctuating disc rotation at recording.

The address field begins with a lead pattern called sector mark (SM), which is followed by three repetitive address information patterns each including a pattern of variable frequency oscillator (VFO) which provides the rotational phase of the revolving disc, an address mark (AM) which indicates the address data starting position and an identifier (ID) which contains a track number, sector number and cyclic redundancy check (CRC) code used for the detection of reproduction error, and ends with a postamble (PA). The three identifiers ($ID_1$, $ID_2$, $ID_3$) in the address field contain the same record of identification signal (ID signal).

The flag field includes a flag (FLAG) which indicates that data has been recorded, an offset detection flag (ODF) which is a mark for the tracking offset detection based on the push-pull scheme, and a region of automatic laser power control (ALPC) used for the adjustment of laser power level.

The data field includes a region for the record of PLL data pattern used for the variable frequency oscillator (VFO), a region for the record of data sync signal (SYNC), and a data field for recording user data, control bytes used for recording data in a relief sector in the case of a defective sector, error correction code (ECC), cyclic redundancy check (CRC) code used for error detection, and special code pattern (RESYNC) used for synchronization.

Based on the conventional sector formats shown in FIGS. 9 and 10, in which the same ID signal is recorded repeatedly in three address fields for coping with defects on the disc, the operation of data write (recording) mode proceeds when the ID signal is read out correctly from at least two of three identifiers and the operation of data read (reproducing) mode proceeds when the ID signal is read out correctly from at least one identifier.

A problem of the above-mentioned conventional sector formats is that having three records of identifiers in each sector is too redundant.

OBJECT AND SUMMARY OF THE INVENTION

An object of the present invention is to reduce the number of records of identifiers in each sector, thereby increasing the recording capacity of user data, while retaining the conventional distinction of ID signal reproducing ability at recording and at reproduction.

The invention resides in a recording and reproducing apparatus for recording and reproducing an information signal on a recording medium having, along each recording track, multiple information recording regions and identifier regions, an ID signal which corresponds to an associated information recording region being recorded in the identifier region, the apparatus comprising means for reproducing the information signal and the ID signal from the recording medium, means for recording at least the information signal on the recording medium, parameter setting means for setting different values of a control parameter of the reproducing means in reproducing mode and recording means in recording mode at least at the reproduction of ID signal, means for detecting whether the reproduction of ID signal has failed (ended in error), and control means which inhibits the reproduction of information signal in reproducing mode or the recording of information signal in recording mode in response to the detection of the error of ID signal reproduction by the error detection means.

For example, the reproducing means is an optical head, and the parameter setting means operates to set a control parameter such as the laser power level of the head.

Alternatively, the reproducing means includes a reproduction head for reproducing the ID signal and information signal, and a bi-leveling means for forming the output signal of the reproduction head into binary data. The parameter setting means operates to set a control parameter of the bi-leveling means.

Alternatively, the reproducing means includes a reproduction head for reproducing the ID signal and information signal, gain control means for controlling the output gain of the reproduction head, and a bi-leveling means for forming the output signal of the gain control means into binary data. The parameter setting means operates to set a gain of the gain control means.

Alternatively, the reproducing means includes an optical head and a servo means (tracking servo means and focusing servo means) for guiding the optical head to trace a recording track of the recording medium. The parameter setting means operates to set a control parameter of the servo means.

The recording medium pertinent to this invention has, along each recording track, multiple information recording regions in which information signals are recorded and identifier regions in which ID signals for the information recording regions are recorded. The reproducing means retrieves the ID signal from the identifier region and retrieves information signal from the information recording region of the recording medium. The recording means records the information signal in the information recording region of the recording medium.

The reproducing means has its control parameter set differently in reproducing mode and in recording mode at least at the reproduction of ID signal. For example, the control parameter is set such that the ID signal is retrieved more readily in reproducing mode than in recording mode i.e., the distinction is imposed on the ID signal reproducing (readout) ability between reproducing mode and recording mode.

The error detection means detects as to whether the ID signal reproduction has failed (ended in error). For example, in case the address field has two identifiers, the error of ID signal reproduction is determined if the ID signal is not retrieved correctly from any of two identifiers. In response to the detection of the ID signal reproduction error, the reproduced information signal is invalidated in reproducing mode or the recording of information signal is suppressed in recording mode. For example, in the case an information signal is reproduced but the reproduced information signal is not output, the reproduction of the information signal is substantially suppressed.

BRIEF DESCRIPTION OF THE DRAWINGS

FIG. 11 is a table showing an example of the data write/read control;

FIG. 12 is a table showing another example of the data write/read control; and

FIG. 13 is a diagram used to explain the detection of the continuity of ID signal.

DESCRIPTION OF THE PREFERRED EMBODIMENTS

Figure 1:
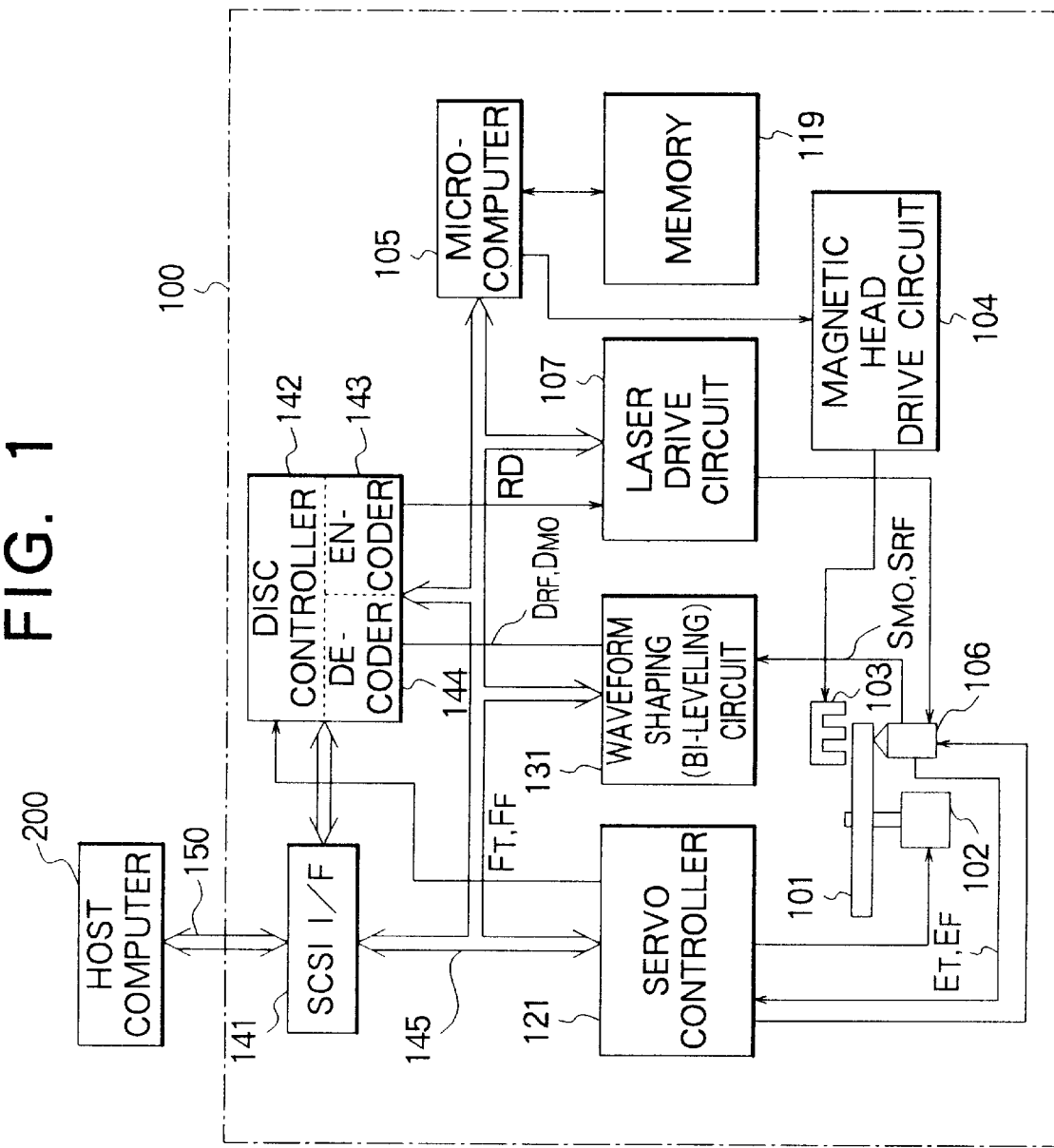
FIG. 1 is a block diagram of the magneto-optical disc recording and reproducing apparatus based on this invention.

The present invention adopts a sector format having two identifiers instead of three, and data writing and data readout are controlled in connection with the two identifiers as shown in FIG. 11 and FIG. 12. In these tables, symbols "o" and "x" indicate the successful and unsuccessful readout of a correct ID signal, respectively.

In the case of control shown in FIG. 11, data writing for a sector in write mode (recording mode) proceeds when the ID signal has been read out correctly from both of two identifiers of the sector, and data readout for a sector in read mode (reproducing mode) proceeds when the ID signal has been read out correctly from at least one of two identifiers of the sector.

In the case of control shown in FIG. 12, data writing in write mode or data readout in read mode for a sector proceeds when the ID signal has been read out correctly from at least one of two identifiers of the sector, and in addition, even if the ID signal has not been read out correctly from any of two identifiers, data readout for the sector proceeds if the continuity of identifier between the preceding and following sectors is predicated.

For example, as shown in FIG. 13, in case the ID signal has been readout correctly from sector 3 of track 100 (100T, 3S), sector 4 of track 100 (100T, 4S), but it has not been read out correctly from target sector 5 of track 100 (100T,5S), the continuity of identifier is predicated if the ID signal is read out correctly from sector 6 of track 100 (100T,6S). In this case, data of the target sector 5 of track 100 is read and saved temporarily in the memory, and after the continuity of identifier is certified by correct readout of identifier of the following sector 6 of track 100, the data of sector 5 is retrieved from the memory and sent to the host computer.

The control scheme shown in FIG. 11, in which data writing cannot proceed when the ID signal is not read out correctly from two identifiers, increases unfavorably the use of relief sectors, while the control scheme shown in FIG. 12, in which data of the target sector needs to be read out and saved in the memory, results unfavorably in an intricate operation.

The present invention is intended to impose the distinction on the ability of ID signal readout between read mode and write mode, thereby avoiding the data writing and readout controls that depend on whether the ID signal is read out correctly from one identifier or two identifiers.

FIG. 1 shows the arrangement of the magneto-optical disc recording and reproducing apparatus based on this invention. The recording and reproducing apparatus 100 adopts a 4-fold density sector format for a 5.25-inch magneto-optical disc 101.

Figure 7:
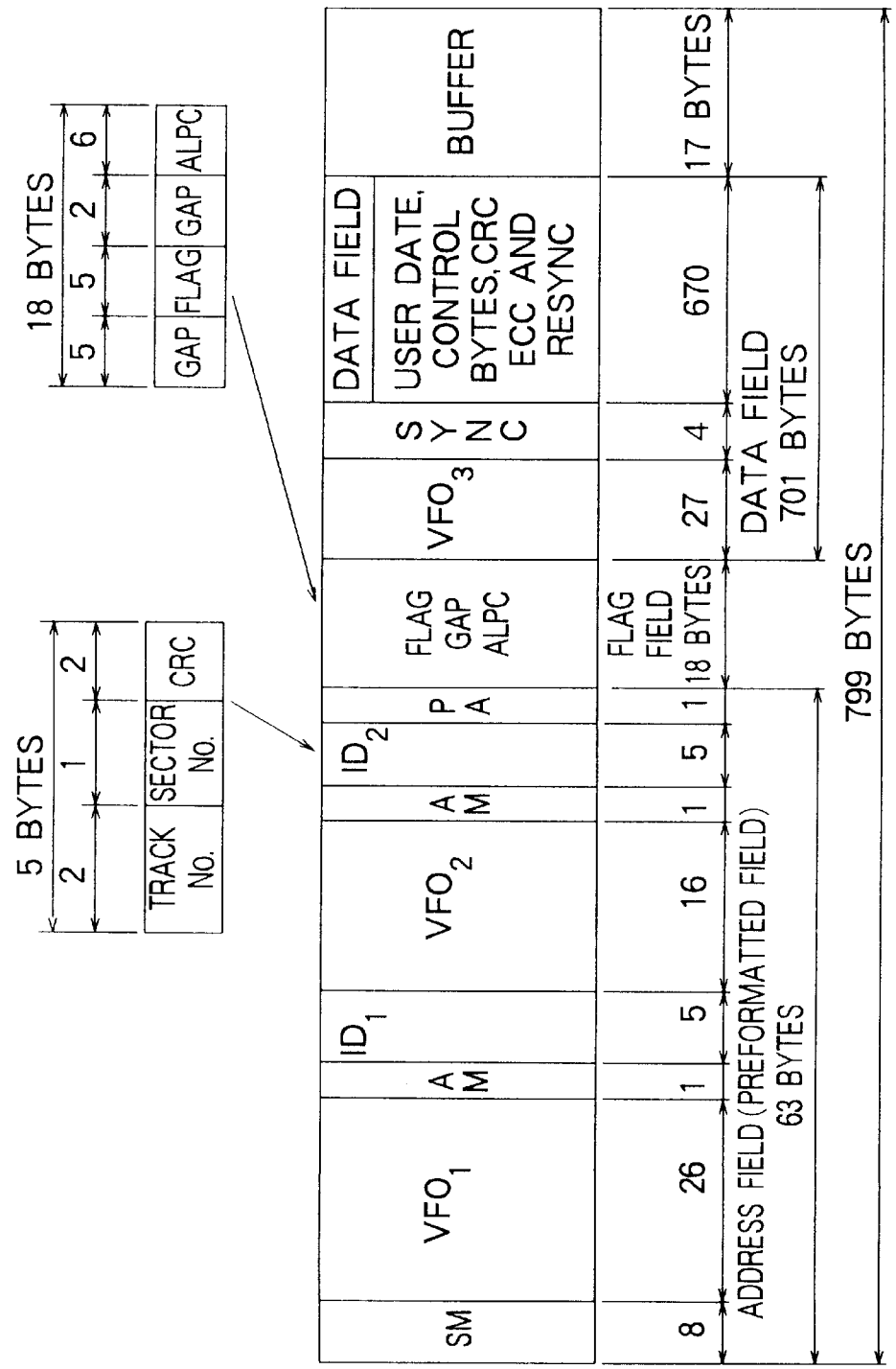
FIG. 7 is a diagram showing a 4-fold density sector format (512 bytes/sector) based on this invention.
Figure 8:
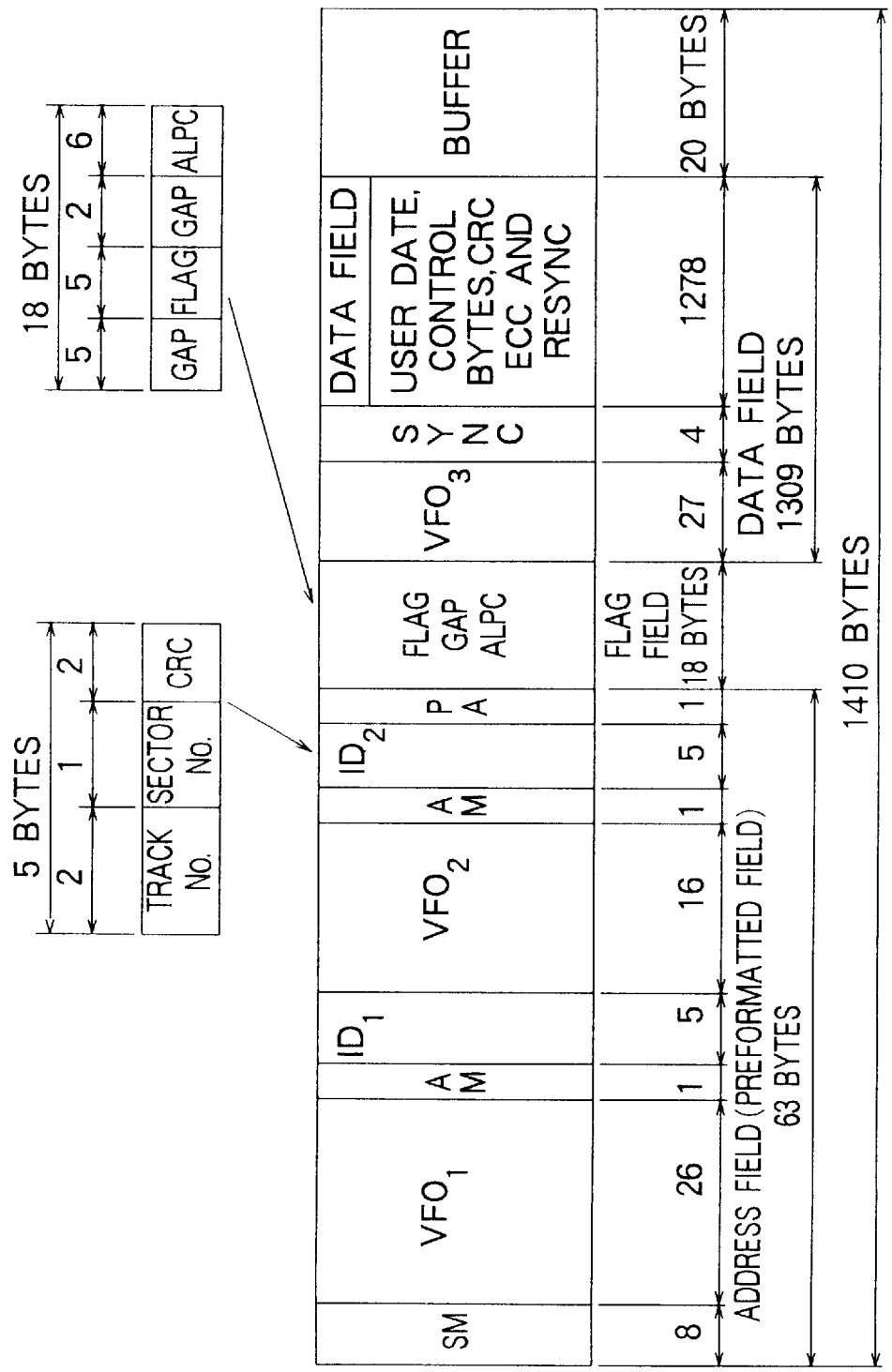
FIG. 8 is a diagram showing a 4-fold density sector format (1024 bytes/sector) based on this invention.
Figure 9:
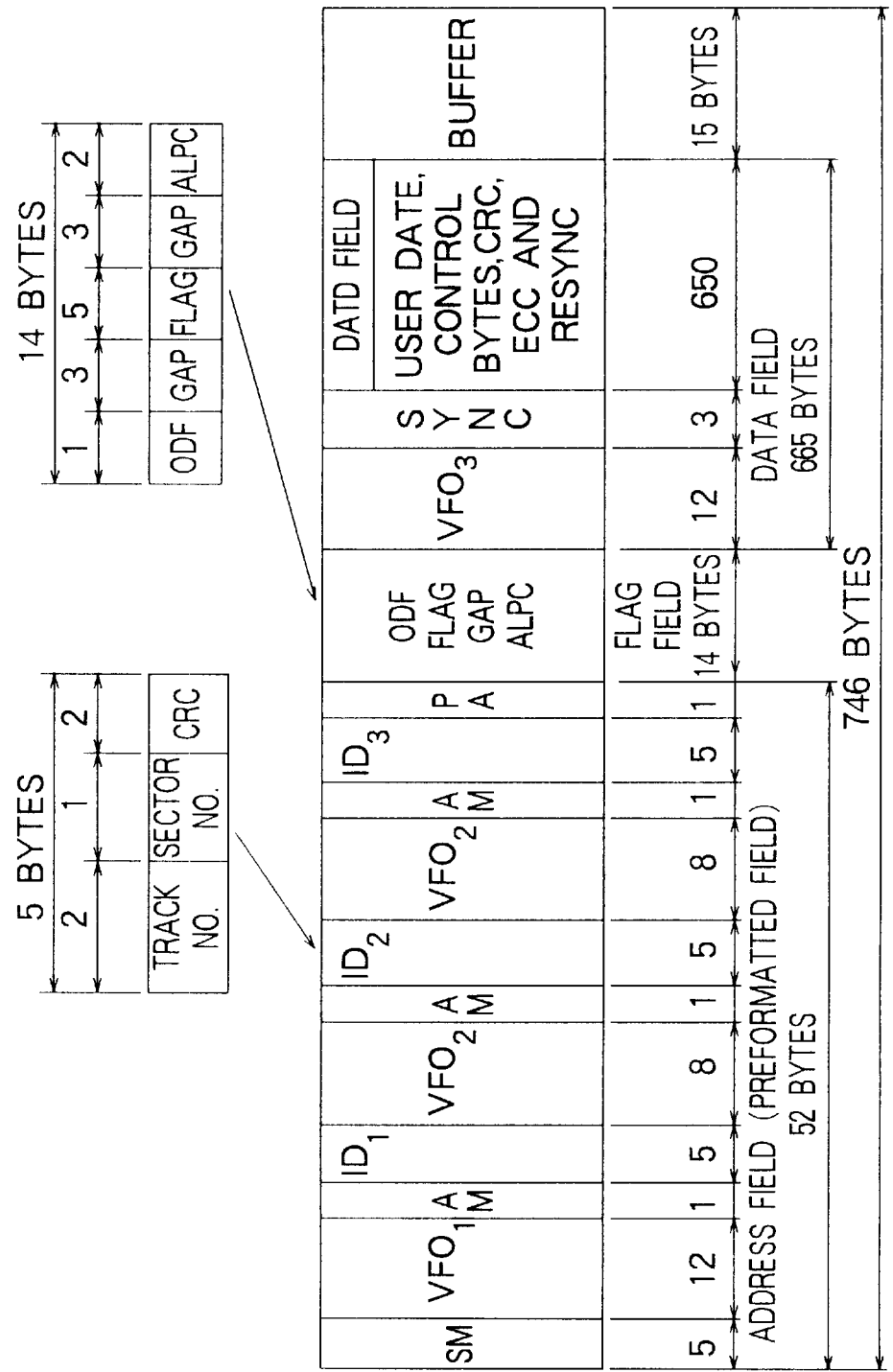
FIG. 9 is a diagram showing a sector format (512 bytes/sector) of a conventional 5.25-inch magneto-optical disc.
Figure 10:
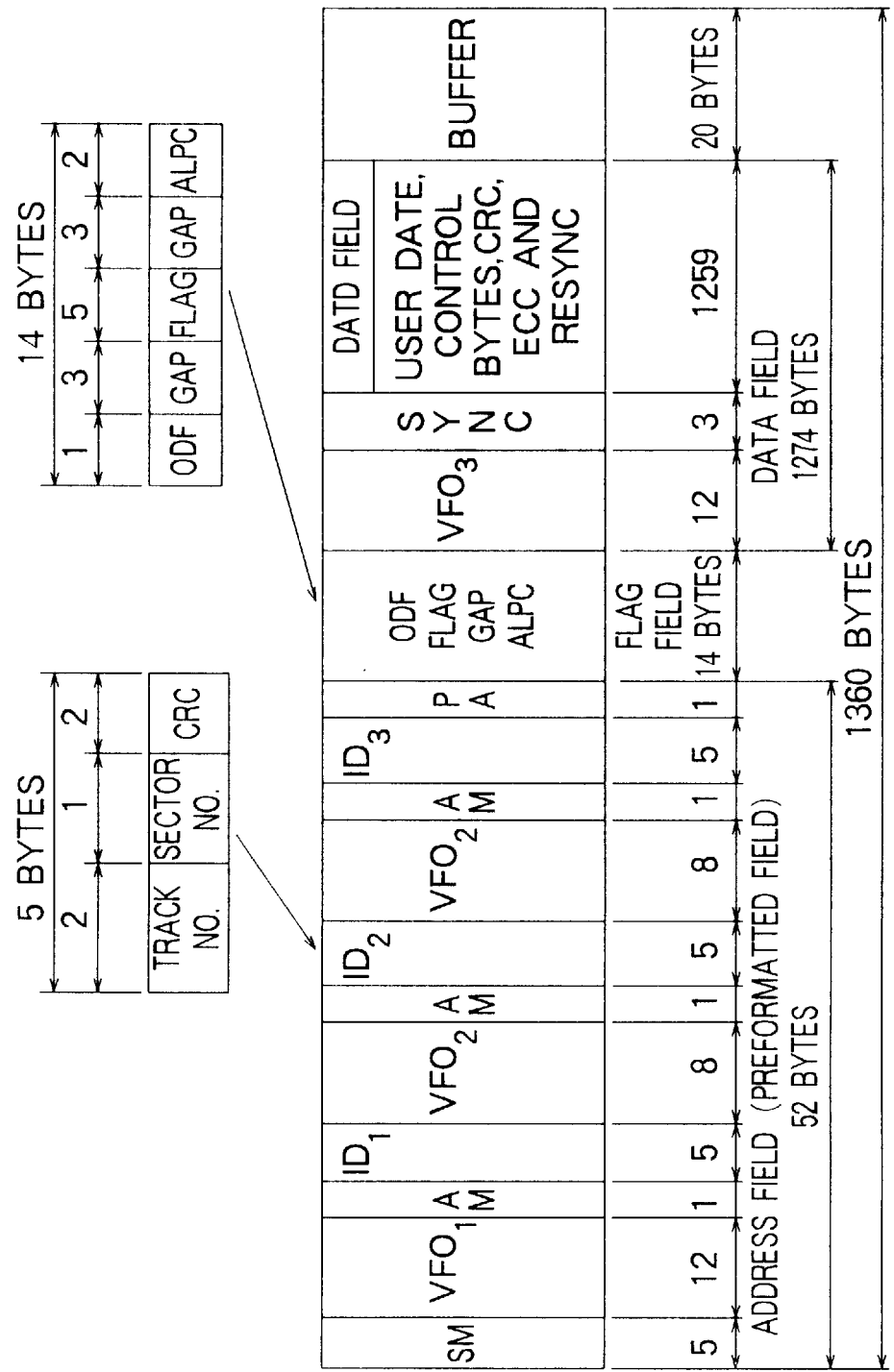
FIG. 10 is a diagram showing a sector format (1024 bytes/sector) of a conventional 5.25-inch magneto-optical disc.

First, the 4-fold density sector format will be explained. FIG. 7 shows a 4-fold density sector format for recording user data in 512 bytes/sector, and FIG. 8 shows a 4-fold density sector format for recording user data in 1024 bytes/sector. These sector formats differ only in the lengths of data field and buffer.

The sector formats shown in FIGS. 7 and 8 include an address field, a flag field, a data field, and a buffer.

The address field is a region having a record of a physical block address that is the physical address of the sector on the disc, and it is preformatted in the form of pits on the disc substrate. The flag field is a region in which a flag indicative of the state of data in the sector is recorded. The data field is a region in which user data is recorded. The buffer is a marginal region provided so that the data field and the address field of the neighboring sector do not overlap in the event of a fluctuating disc rotation at recording.

The address field begins with a lead pattern called sector mark (SM), which is followed by two repetitive address information patterns each including a pattern of variable frequency oscillator (VFO) which provides the rotational phase of the revolving disc, an address mark (AM) which indicates the address data starting position and an identifier (ID) which contains a track number, sector number and cyclic redundancy check (CRC) code used for the detection of reproduction error, and ends with a postamble (PA). The two identifiers ($ID_1$, $ID_2$) in the address field contain the same record of identification signal (ID signal).

The flag field includes a flag (FLAG) which indicates that data has been recorded, and a region of automatic laser power control (ALPC) used for the adjustment of laser power level.

The data field includes a region for the record of PLL data pattern used for the variable frequency oscillator (VFO), a region for the record of data sync signal (SYNC), and a data field for recording user data, control bytes used for recording data in a relief sector in the case of a defective sector, error correction code (ECC), cyclic redundancy check (CRC) code used for error detection, and special code pattern (RESYNC) used for synchronization.

The 4-fold density sector format shown in FIGS. 7 and 8 having only two identifiers in the address field provides an increased recording capacity as compared with the format with three identifiers.

Returning to FIG. 1, the recording and reproducing apparatus 100 includes a spindle motor 102 for rotating the magneto-optical disc 101, a magnetic head 103 which generates a subordinate magnetic field at a write (recording) operation and erasing operation, a head drive circuit 104 which energizes the magnetic head 103, and a microcomputer 105 as a system controller for controlling the overall apparatus. The microcomputer 105 controls the head drive circuit 104 so that the magnetic head 103 generates subordinate magnetic fields in opposite directions at writing and at erasing.

The apparatus 100 further includes an optical head (optical pickup) 106 including a laser diode, objective lens, optical sensor and pre-amplifier, and a laser drive circuit 107 which energizes the laser diode of the optical head 106. The magnetic head 103 and optical head 106 are disposed to confront each other, with the magneto-optical disc 101 being interleaved therebetween.

The laser drive circuit 107 is supplied in write mode with input data RD to be recorded, which will be explained later. The laser diode in the optical head 106 is controlled to turn on and off in response to the input data RD, and the data RD is recorded in the data field on the disc 101.

The optical head 106 retrieves a signal $S_{MO}$ from the data field of the disc 101 in read mode, and it retrieves a signal $S_{RF}$ from the address field (preformatted field) of the disc 101 in write mode and read mode. The optical head 106 further retrieves a tracking error signal ET and focusing error signal $E_F$ from the disc 101 basedon the conventional detecting manner.

Figure 2:
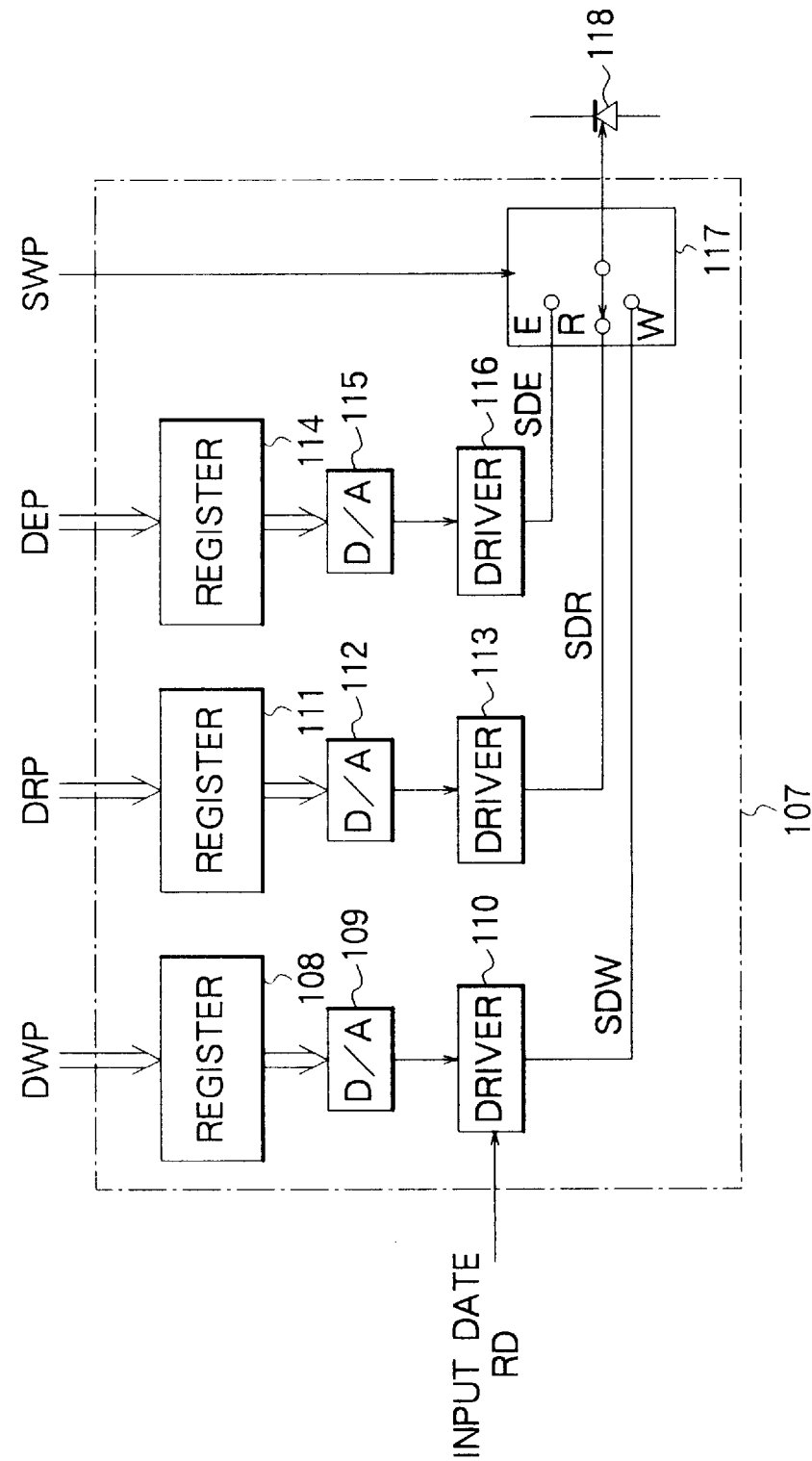
FIG. 2 is a block diagram of the laser drive circuit of the apparatus

FIG. 2 shows the arrangement of the laser drive circuit 107. The laser drive circuit 107 includes a register 108 which holds laser power control data DWP for writing, a D/A converter 109 which converts the control data DWP into an analog signal, and a driver 110 which modulates the output signal of the D/A converter 109 with the input data RD to produce a drive signal SDW.

The laser drive circuit 107 further includes a register 111 which holds laser power control data DRP for reading, a D/A converter 112 which converts the control data DRP into an analog signal, and a driver 113 which produces a drive signal SDR from the analog signal.

The laser drive circuit 107 further includes a register 114 which holds laser power control data DEP for erasing, a D/A converter 115 which converts the control data DEP into an analog signal, and a driver 116 which produces a drive signal SDE from the analog signal.

The registers 108, 111 and 114 are loaded the control data DWP, DRP and DEP as control parameters under control of the microcomputer 105. The control data DRP loaded to the register 111 differs depending on whether the host computer issues a write command (write mode) or read command (read mode) so that the reading laser power is lowered in write mode thereby to lower the reproducing (readout) ability of ID signal from the address field as compared with the case of read mode. The control data DWP, DRP and DEP are stored in advance in a non-volatile memory 119 connected to the microcomputer 105.

The laser drive circuit 107 further includes a switch circuit 117, which selects one of the drive signals SDW, SDR and SDE produced by the drivers 110, 113 and 116 in accordance with a switching control signal SWP provided by a disc controller (explained later) under control of the microcomputer 105, and supplies the selected drive signal to the laser diode 118.

In read mode, the switch circuit 117 is kept to select the drive signal SDR, by which the laser diode 118 is driven to retrieve signals in the address field and data field of the disc 101.

In write mode, the switch circuit 117 is kept to select the drive signal SDR until the target ID signal is retrieved, and thereafter it is controlled to select the drive signal SDE for the duration of the target data field, and thereafter it is controlled to select the drive signal SDW for the duration of the target data field.

When the switch circuit 117 is controlled to select the drive signal SDE from the driver 116, the laser diode 118 is energized by it to erase the target data field, and when the switch circuit 117 is controlled to select the drive signal SDW from the driver 110, the laser diode 118 is energized by it to record the input data PRD in the target data field. Namely, during the data recording operation, the target ID signal on the disc 101 is retrieved, and next the target data field is erased, and thereafter the input data RD is recorded in the data field.

Returning again to FIG. 1, the recording and reproducing apparatus 100 further includes a servo controller 121, which is supplied with the error signals $E_T$ and $E_F$ provided by the optical head 106. The servo controller 121 implements the tracking control, focusing control and sliding control for the optical head 106 and the rotation control for the spindle motor 102 all under control of the microcomputer 105.

The servo controller 121 produces a tracking fault signal $F_T$ and focusing fault signal $F_F$ from the tracking error signal $E_T$ and focusing error signal $E_F$, respectively.

Figure 3:
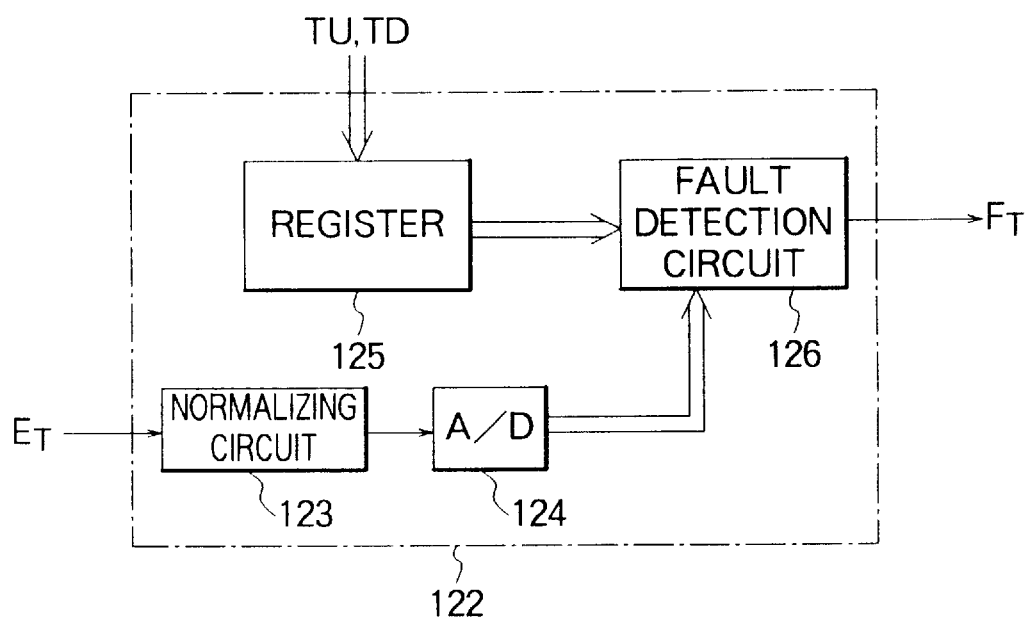
FIG. 3 is a block diagram of the tracking fault detecting circuit in the servo controller of the apparatus.

FIG. 3 shows the arrangement of the tracking fault detector 122 in the servo controller 121. It includes a normalizing circuit 123 which normalizes the tracking error signal $E_T$ and an A/D converter 124 which converts the normalized tracking error signal into digital data.

The tracking error signal $E_T$ produced by the optical head 106 varies in its level due to the variation in the output power of laser diode and the sensitivity of optical sensor even though the displacement of the optical head 106 with respect to tracks is unchanged. The normalizing circuit 123 is intended to compensate the unequality in the output power of laser diode and the sensitivity of optical sensor, and the circuit 123 has its gain established such that the tracking error signal ET has a certain level for a certain displacement of the optical head 106. The A/D converter 124 is designed to deliver value 80 in hexadecimal for the center value of the tracking error signal $E_T$ (no displacement).

The tracking fault detector 122 further includes registers 125 which hold an upper and lower threshold values TU and TD of tracking fault detection, and a fault detecting circuit 126 which delivers the tracking fault signal $F_T$ if the digital tracking error signal provided by the A/D converter 124 is outside the range between the threshold values TU and TD.

The threshold values TU and TD loaded as control parameters to the registers 125 under control of the microcomputer 105 differ depending on whether the host computer issues a write command or read command, i.e., $TU_W$ and $TD_W$ in write mode or $TU_R$ and $TD_R$ in read mode. These threshold values are selected to meet the conditions of $TU_W < TU_R$ and $TD_W > TD_R$, and stored in advance in the non-volatile memory 119 connected to the microcomputer 105. Accordingly, the generation of tracking fault signal $F_T$ is more likely in write mode than in read mode.

Figure 4:
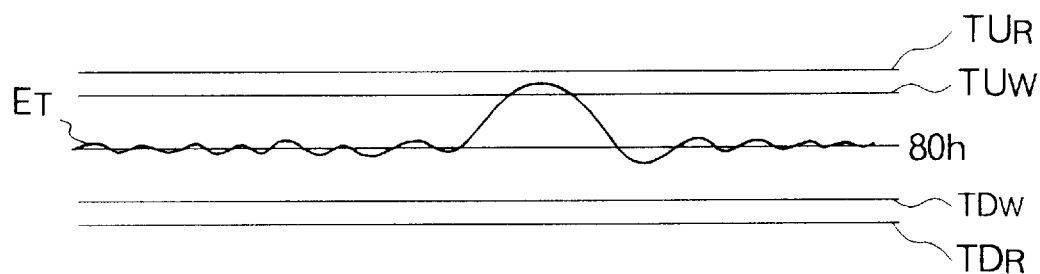
FIG. 4 is a diagram used to explain the tracking fault detection.

In operation, when the tracking error signal $E_T$ varies in write mode as shown in FIG. 4, the tracking fault signal $F_T$ is produced as the tracking error signal $E_T$ exceeds the threshold value $TU_W$, whereas in read mode, the tracking fault signal $F_T$ is not produced since the tracking error signal $E_T$ does not go out of the range of threshold values $TU_R$ and $TD_R$.

The focus fault detector in the servo controller 121 has the arrangement similar to the tracking fault detector 122 explained above, and it produces a focus fault signal $F_F$ when the focus error signal $E_F$ goes out of the range of its threshold values. Different threshold values are loaded depending on whether the host computer issues a write command or read command so that the generation of focus fault signal $F_F$ is more likely in write mode than in read mode.

Returning to FIG. 1, the recording and reproducing apparatus 100 further includes a waveform shaping circuit 131 which implements the waveform equalizing process and bi-leveling process for the reproduced signals $S_{RF}$ and $S_{MO}$ from the optical head 106 and delivers the resulting binary data $D_{RF}$ and $D_{MO}$ to the decoder of the disc controller, which will be explained later.

Figure 5:
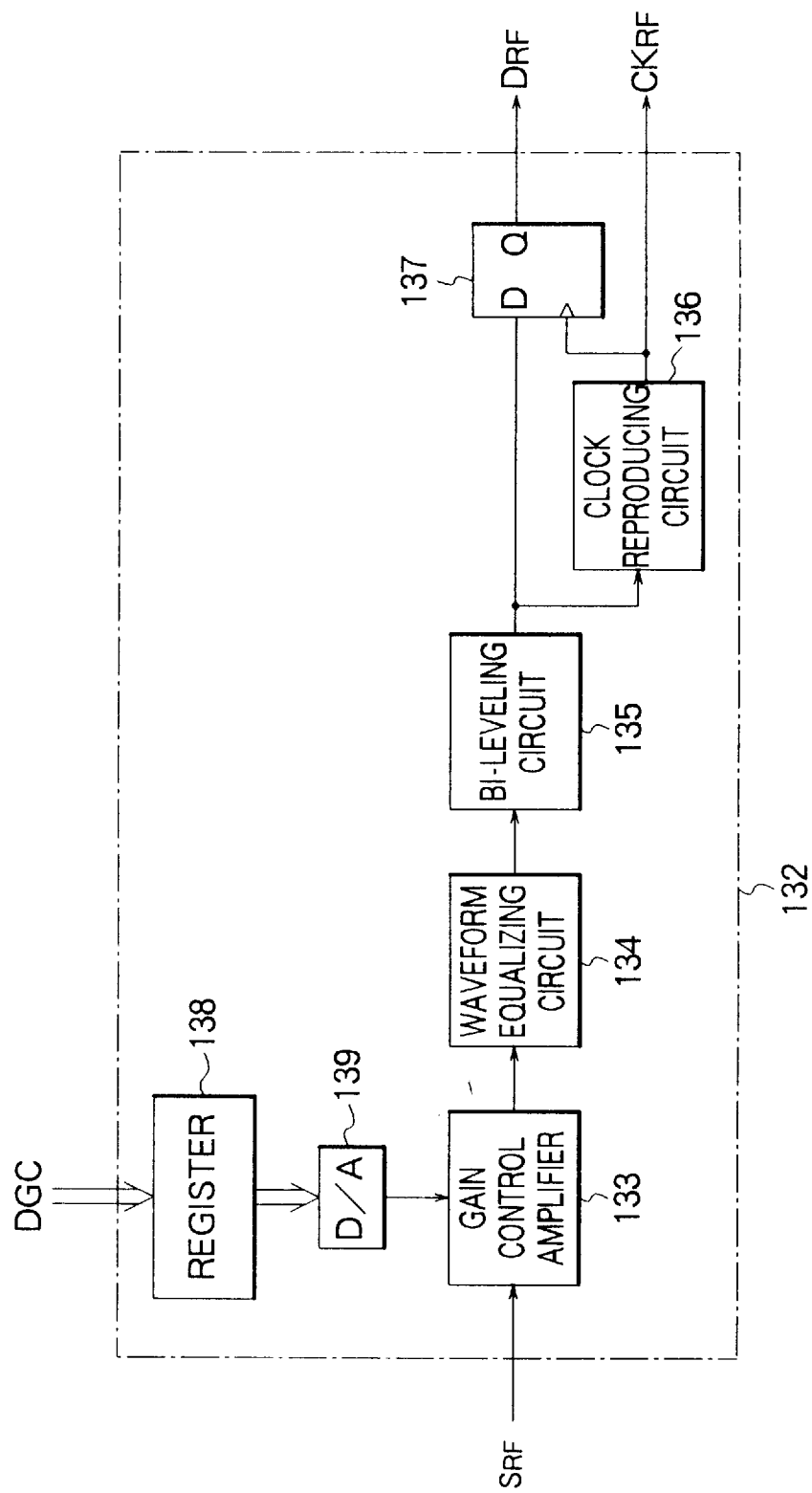
FIG. 5 is a block diagram of the readout signal processing circuit in the waveform shaping circuit.

FIG. 5 shows the arrangement of the $S_{RF}$ signal processor 132 in the waveform shaping circuit 131. The processor 132 includes a gain-control amplifier 133 which amplifies the reproduced signal $S_{RF}$, a waveform equalizing circuit 134 which implements the waveform equalizing process for the amplified reproduced signal, a bi-leveling circuit 135 which implements the bi-leveling process for the output signal of the circuit 134 based on the comparison with a certain threshold value, a clock reproducing circuit 136 which extracts the clock signal $CK_{RF}$ from the output data of the bi-leveling circuit 135, and a D-type flip-flop 137 which latches the output data of the bi-leveling circuit 135 in response to the clock signal $CK_{RF}$ to produce binary data $D_{RF}$ which is synchronous with $CK_{RF}$. The decoder of the disc controller is also supplied with the clock signal $CK_{RF}$ in addition to the binary data from the D-type flip-flop 137.

The processor 132 further includes a register 138 which holds control data DGC used to control the gain of amplifier 133 as a control parameter under control of the microcomputer 105, and a D/A converter 139 which converts the control data DGC in the register 138 into an analog gain control signal and supplies it to the gain-control amplifier 133.

The gain control data DGC loaded to the register 138 differs depending on whether the host computer issues a write command or read command. Consequently, the gain-control amplifier 133 has a smaller gain for the reproduced signal $S_{RF}$ in write mode than in read mode so that the ability of reproducing (reading out) the ID signal from the address field is lowered. The gain control data DGC is stored in advance in the non-volatile memory 119 connected to the microcomputer 105.

Returning again to FIG. 1, the recording and reproducing apparatus 100 further includes an SCSI (small computer system interface) 141 used to transact commands and data with the host computer, and a disc controller 142 which transfers the command received by the interface 141 from the host computer to the microcomputer 105, forms input data RD for recording by processing data received by the interface 141 from the host computer, extracts the ID signal of the address field by processing the binary data $D_{RF}$ and $D_{MO}$ provided by the waveform shaping circuit 131, and reads out data to be sent to the host computer.

The disc controller 142 includes a buffer memory. Data to be recorded from the host computer is stored temporarily in the buffer memory, and thereafter rendered the error correction code adding process and modulation process by the encoder 143, and it is formed into input data RD for recording. The binary data $D_{MO}$ is rendered the demodulation process and error correction process by the decoder 144, and it is formed into readout data. The readout data is stored temporarily in the buffer memory, and thereafter it is sent to the host computer by way of the interface 141 at a certain timing.

The decoder 144 in the disc controller 142 extracts data of identifier in the address field from the binary data $D_{RF}$, demodulates the data, and reproduces a correct ID signal based on the CRC operation. At the issuance of a write command or read command by the host computer, the target ID signal is detected following the seek operation as will be explained later. If the decoder 144 has failed to retrieve a correct ID signal from any of two identifiers, the ID signal reproduction (readout) ends in error.

In case the servo controller 121 delivers the tracking fault signal $F_T$ or focus fault signal $F_F$ at the detection of the target ID signal following the seek operation, the ID signal detecting operation aborts and the ID signal reproduction (readout) ends in error. The result of ID signal detection (inclusive of error) by the disc controller 142 is delivered to the microcomputer 105, and the write operation and read operation are controlled based on it.

The interface (SCSI) 141, disc controller 142, servo controller 121, waveform shaping circuit 131 and laser drive circuit 107 are all connected to the microcomputer 105 through a central processing unit (CPU) bus 145. The interface 141 is connected to the host computer 200 through a SCSI bus 150.

Figure 6:
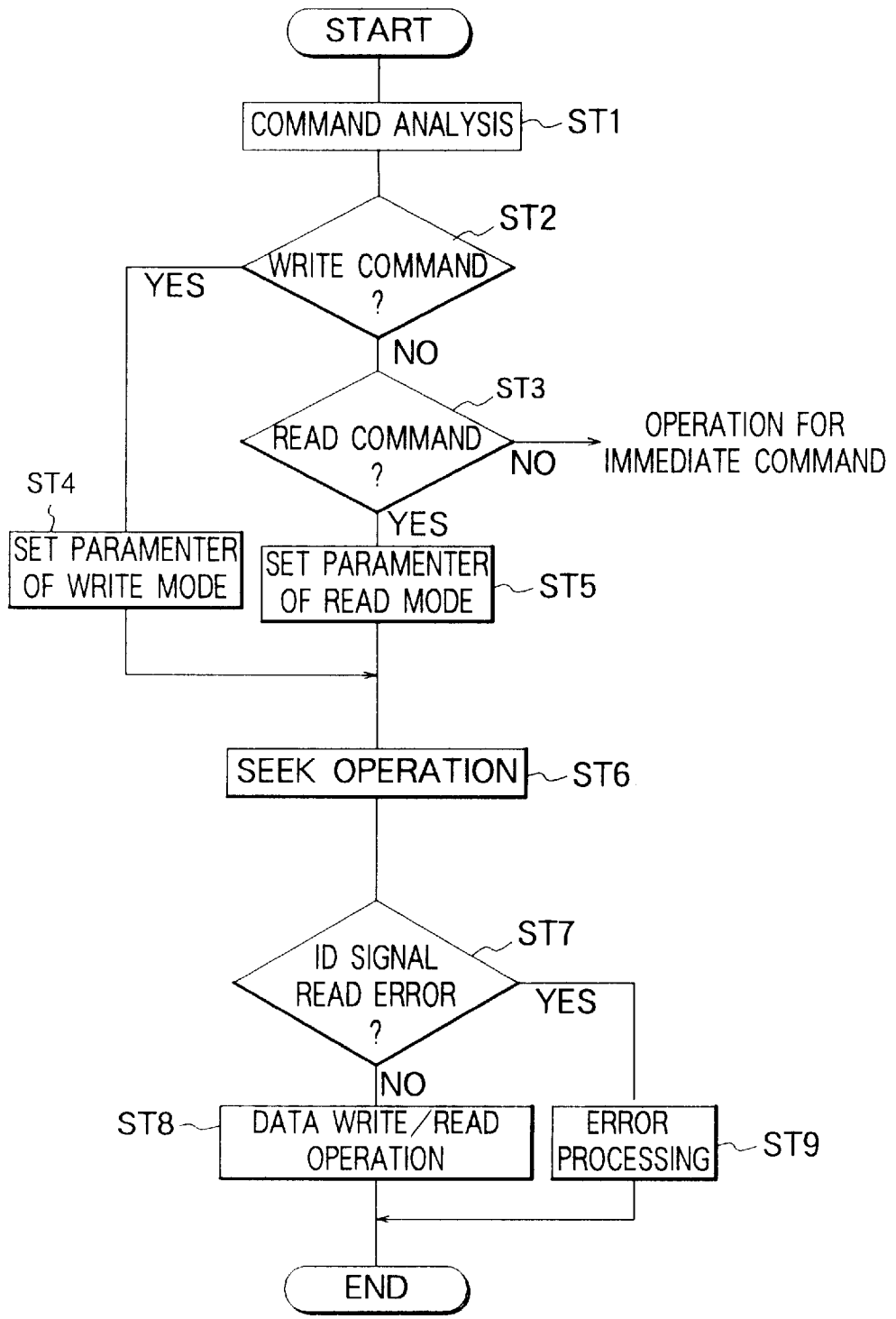
FIG. 6 is a flowchart showing the control operation of the microcomputer at command reception from the host computer.

Next, the operation of the magneto-optical disc recording and reproducing apparatus 100 shown in FIG. 1 will be explained on the flowchart of FIG. 6 which shows the control operation of the microcomputer 105 following the reception of a command from the host computer 200.

A command from the host computer 200 received by the interface 141 is transferred to the microcomputer 105 by way of the disc controller 142. The microcomputer 105 analyzes the command (step ST1), and discriminates whether the command is the data write command or data read command or other (steps ST2, ST3). If the command is neither the data write command nor data read command, the microcomputer 105 proceeds to the control operation relevant to the immediate command.

When the command is found to be the data write command, the microcomputer 105 fetches the control parameters of write mode from the memory 119 and sets the parameters to the laser drive circuit 107, servo controller 121 and waveform shaping circuit 131 (step ST4).

Specifically, reading laser power control data DRP of write mode is loaded to the register 111 (see FIG. 2) of the laser drive circuit 107. Consequently, the reading laser power is lowered relative to read mode so that the ability of reproducing (reading out) the ID signal from the identifier of address field is lowered.

The threshold values $TU_W$ and $TD_W$ of write mode are loaded to the registers 125 of the tracking fault detector 122 (see FIG. 3) in the servo controller 121. Consequently, the generation of tracking fault signal $F_T$ becomes more likely than in read mode. Similarly, the threshold values of write mode are loaded to the registers of the focus fault detector in the servo controller 121. Consequently, the generation of focus fault signal $F_F$ becomes more likely than in read mode.

If the tracking fault signal $F_T$ or focus fault signal $F_F$ is produced at the detection of the target ID signal following the seek operation, the ID signal detection is aborted, as explained above. On this account, the threshold value data of write mode are loaded to the registers of the tracking fault detector 122 and focus fault detector in the servo controller 121 so that the ability of reproducing (reading out) the ID signal from the identifier of address field is lowered.

The gain control data DGC of write mode is loaded to the register 138 of the $S_{RF}$ signal processor 132 (see FIG. 5) in the waveform shaping circuit 131. Consequently, the gain-control amplifier 133 has a smaller gain for the reproduced signal $S_{RF}$ than in read mode, and the ability of reproducing (reading out) the ID signal from the identifier of address field is lowered.

When the command is found to be the data read command, the microcomputer 105 fetches the control parameters of read mode from the memory 119 and sets the parameters to the laser drive circuit 107, the servo controller 121 and the waveform shaping circuit 131 (step ST5) Consequently, the ability of reproducing (reading out) the ID signal from the identifier of address field is enhanced.

In the above-mentioned cases of the data write command and the data read command, with the respective control parameters being set to the laser drive circuit 107, the servo controller 121 and the waveform shaping circuit 131, the microcomputer 105 controls the servo controller 121 to carry out the seek operation for positioning the optical head 106 to the target track (step ST6). The seek operation takes place by making reference to the ID signal (track number and sector number) extracted from the binary data $S_{RF}$ from the waveform shaping circuit 131 by the decoder 144 of the disc controller 142. The seek operation does not take place if the head is already located on the target track.

The disc controller 142 continues the ID signal detection even after the seek operation. Specifically, data of the identifier of address field is extracted from the binary data $D_{RF}$ and demodulated so that the ID signal is detected based on the CRC operation, and the result of detection is sent to the microcomputer 105 by the disc controller 142.

During these operations, the microcomputer 105 determines whether the reproduction (readout) of target ID signal is erroneous (step ST7). Namely, if a correct ID signal is not retrieved from any of two identifiers of the target address field, the error of ID signal reproduction is determined.

If the tracking fault signal FT or focus fault signal $F_F$ is produced by the servo controller 121 at the detection of the target ID signal following the seek operation, the ID signal detection is aborted, as explained above, and the ID signal reproduction (readout) ends in error.

Otherwise, when a correct ID signal is retrieved successfully from at least one of two identifiers of the target address field, the microcomputer 105 operates on the disc controller 142 to proceed to the data write operation or data read operation (step ST8).

In case the host computer 200 issues a data write command, i.e., write mode, the data write operation takes place. Initially, the target data field of the disc 101 is erased, and next input data RD provided by the encoder 143 of the disc controller 142 is recorded in the data field. Prior to the recording operation, data to be recorded received by the interface 141 from the host computer 200 is stored in the buffer memory, and it is rendered the error correction code adding process and modulation process by the encoder 143 and formed into input data RD for recording.

In case the host computer 200 issues the data read command, i.e., read mode, the data read operation takes place. Specifically, the binary data $D_{MO}$ derived from the reproduced signal $S_{MO}$ of the target data field on the disc 101 is rendered the demodulation and error correction by the decoder 144 of the disc controller 142. The resulting readout data is stored temporarily in the buffer memory, and thereafter it is sent to the host computer 200 by way of the interface 141 at a certain timing.

Otherwise, in case no correct ID signal is retrieved from any of two identifiers of the target address field, i.e., target ID signal reproduction ends in error, the microcomputer 105 proceeds to the error processing, e.g., it indicates the rejection of command execution to the host computer 200, (step ST9).

As another example of error processing, the microcomputer 105 retries the detection of the error of target ID signal reproduction (readout) based on the result of ID signal detection provided by the disc controller 142, and it proceeds to the write operation or read operation if the error of ID signal reproduction is nagated. In this case, of the case of read mode, the control parameters that have been set in step ST5 may be altered so as to enhance the ability of ID signal reproduction with the intention of promoting the successful retrieval of data from the target data field on the disc 101 in read mode.

Detection of the error of target ID signal reproduction, may be retried more than once so that the rejection of command execution is indicated to the host computer 200 when the error of target ID signal reproduction is finally determined.

According to the foregoing embodiment of this invention, the control parameters set to the laser drive circuit 107, servo controller 121 and waveform shaping circuit 131 are made different for the case of data write command (write mode) and for the case of data read command (read mode) issued by the host computer 200, thereby imposing the distinction on the ID signal reproducing (readout) ability between write mode and read mode. Specifically, the ID signal reproducing ability is made lower in write mode than in read mode.

Accordingly, proceeding to the data recording operation or data readout operation in response to the retrieval of a correct ID signal from at least one of two identifiers of the target address field (refer to steps ST7 and ST8 of FIG. 6) is equivalent but not equal to having a data recording operation or data readout operation depending on the number of ID signals retrieved correctly from two identifiers.

Consequently, this embodiment is rid of the impropriety of the abortion of data recording operation when the ID signal is not retrieved correctly from both of two identifiers, resulting in which case in the use of an increased number of relief sectors, as shown in FIG. 11, and the impropriety of the intricate operation for reading out and saving data of a sector from which the ID signal cannot be retrieved correctly, as shown in FIG. 12.

Although in the foregoing embodiment, the control parameters to be set to the laser drive circuit 107, servo controller 121 and waveform shaping circuit 131 are made different in write mode and in read mode, thereby imposing the distinction on the ID signal reproducing (readout) ability between these modes, an alternative manner is to make different only part of these control parameters in write mode and in read mode, thereby imposing the distinction on the ID signal reproducing (readout) ability between write mode and readmode.

Although in the foregoing embodiment, different control parameters of write mode and read mode are set to the laser drive circuit 107, servo controller 121 and waveform shaping circuit 131, other circuits having control parameters pertinent to the ID signal reproducing ability may have a setting of control parameters that are different in write mode and in read mode.

Although in the foregoing embodiment, the servo controller 121 and tracking fault detector 122 (see FIG. 3) have their control parameters of threshold values TU and TD made different in write mode and in read mode, an alternative design is to set different gains of the normalizing circuit 123 for the tracking error signal ET in write mode and in read mode. This variant design is also applicable to the focus fault detector in the servo controller 121.

Although in the foregoing embodiment, the $S_{RF}$ signal processor 132 of the waveform shaping circuit 131 (see FIG. 5) has its gain control data DGC made different in write mode and in read mode, an alternative design is to use the threshold value of the bi-leveling circuit 135 in place of DGC and set different threshold values in write mode and in read mode.

Although in the foregoing embodiment, the same reading laser power is applied to the address field (preformatted field) and data field in read mode, the reading laser power may be switched between those for the address field and data field.

Although in the foregoing embodiment, the recording format of the magneto-optical disc 101 is a 4-fold density sector format for a 5.25-inch disc, with two identifiers being included in the address field, the present invention can also be applied to a recording format that is a sector format with three identifiers included in the address field.

Although the foregoing embodiment is a magneto-optical disc recording and reproducing apparatus, the present invention can be applied obviously to other recording and reproducing apparatus which records and reproduces an information signal on a recording medium having, along each recording track, multiple information recording regions and identifier regions in which ID signals which correspond to the information recording regions are recorded.

According to this invention, the recording and reproducing apparatus, which records and reproduces an information signal on a recording medium having, along each recording track, multiple information recording regions and identifier regions in which ID signals which correspond to the information recording regions are recorded, operates to set control parameters that are different in write mode and in read mode for use in reproducing the ID signal by the reproducing means and servo means, whereby it is possible to make distinction of the ID reproducing (readout) ability between write mode and read mode.

Consequently, having a data recording operation or data readout operation in response to the retrieval of a correct ID signal from at least one of two, for example, identifiers of the address field is equivalent to having a data recording operation or data readout operation depending on the number of ID signals retrieved correctly from two identifiers. Accordingly, the present invention eliminates the need of data write control and data read control that depend on the number of ID signals retrieved correctly from two identifiers, and is rid of the impropriety associated with the data write control and data read control based on different numbers of times of correct ID signal retrieval.

What is claimed is:

1. A recording and reproducing apparatus for recording and reproducing an information signal on a recording medium having, along a recording track, a plurality of information recording regions and identifier regions, an identification (ID) signal which corresponds to an associated information recording region being recorded in the identifier region, said apparatus comprising:

means for reproducing the information signal and the ID signal from said recording medium;

means for recording at least the information signal on said recording medium;

means for setting a control parameter relating to said reproducing means, said control parameter being different in reproducing mode in which the information signal is reproduced and in recording mode in which the information signal is recorded at least at the reproduction of ID signal;

means for detecting whether the reproduction of ID signal has ended in error; and control means which inhibits the reproduction of information signal in said reproducing mode and the recording of information signal in said recording mode in response to the detection of the error of ID signal reproduction by said error detection means.

2. A recording and reproducing apparatus according to claim 1, wherein said signal reproducing means comprises an optical head and said control parameter setting means operates to set a control parameter relating said optical head.

3. A recording and reproducing apparatus according to claim 2, wherein said parameter setting means operates to set different values of laser power level as said control parameter of said optical head in said reproducing mode and in said recording mode at the reproduction of the ID signal.

4. A recording and reproducing apparatus according to claim 3, wherein said error detection means detects the error of ID signal reproduction based on the signal reproduced from said identifier region by said optical head.

5. A recording and reproducing apparatus according to claim 1, wherein said signal reproducing means includes a reproduction head for reproducing the ID signal and the information signal, and bi-leveling means for forming the output signal of said reproduction head into binary data, said parameter setting means operating to set a control parameter of said bi-leveling means.

6. A recording and reproducing apparatus according to claim 5, wherein said signal reproducing means further includes gain-controlling means connected between said reproduction head and said bi-leveling means, said parameter setting means operating to set different values of gain of said gain-controlling means in said reproducing mode and in said recording mode.

7. A recording and reproducing apparatus according to claim 6, wherein said error detection means detects the error of ID signal reproduction based on the output signal of said bi-leveling means.

8. A recording and reproducing apparatus according to claim 2 further including servo means for guiding said optical head to trace said recording track on said recording medium, said parameter setting means operating to set a control parameter relating to said servo means.

9. A recording and reproducing apparatus according to claim 8, wherein said servo means includes servo error detection means which detects the positioning error of said optical head with respect to said recording track and produces a servo error signal, and tracking means which guides said optical head to trace said recording track in accordance with the servo error signal, and wherein said error detection means includes first means for detecting the error of ID signal reproduction based on the signal reproduced from said identifier region by said optical head, and second means for detecting the error of ID signal reproduction in response to the amplitude of the servo error signal in excess of a threshold value regardless of the detection result of said first means, said parameter setting means operating to set different values of the threshold value as said control parameter in said reproducing mode and in recording mode.

10. A recording and reproducing apparatus according to claim 9, wherein said servo means includes tracking error detection means which detects the tracking error of said optical head with respect to said recording track.

11. A recording and reproducing apparatus according to claim 9, wherein said servo means includes focus error detection means which detects the focus error of said optical head with respect to said recording track.

12. A recording and reproducing apparatus according to claim 1, wherein said identifier regions have duplicate records of ID signal.

\* \* \* \* \*